US006703135B1

(12) United States Patent
Dietz et al.

(10) Patent No.: US 6,703,135 B1
(45) Date of Patent: Mar. 9, 2004

(54) METHOD FOR PRODUCING A CORROSION PROTECTIVE COATING AND A COATING SYSTEM FOR SUBSTRATES MADE OF LIGHT METAL

(75) Inventors: Andreas Dietz, Wolfenbuttel (DE); Volker Von Der Heide, Hamburg (DE)

(73) Assignee: Fraunhofer-Gesellschaft zur Fordering der angewandten Forschung e.V., Munich (DE)

( * ) Notice: Subject to any disclaimer, the term of this patent is extended or adjusted under 35 U.S.C. 154(b) by 0 days.

(21) Appl. No.: 09/623,231

(22) PCT Filed: Feb. 26, 1999

(86) PCT No.: PCT/EP99/01267

§ 371 (c)(1), (2), (4) Date: Aug. 28, 2000

(87) PCT Pub. No.: WO99/43869

PCT Pub. Date: Sep. 2, 1999

(30) Foreign Application Priority Data

Feb. 26, 1998 (DE) ........................................ 198 07 823

(51) Int. Cl.[7] ................................................ B32B 15/04

(52) U.S. Cl. .................... 428/469; 428/472.2; 427/404; 427/405; 205/199; 205/202; 205/203

(58) Field of Search ................................. 205/198, 199, 205/202, 203; 427/404, 405; 428/469, 472.2

(56) References Cited

U.S. PATENT DOCUMENTS 5,774,336 A * 6/1998 Larson ....................... 361/720

FOREIGN PATENT DOCUMENTS

| | | | |
|---|---|---|---|
| DE | 42 03 577 A1 | | 8/1992 |
| DE | 195 39 645 A1 | | 10/1996 |
| DE | 196 21 861 A1 | | 12/1997 |
| GB | 2 253 415 A | | 9/1992 |
| JP | 61-246398 A | * | 11/1986 |
| WO | 91/03583 | | 3/1991 |

OTHER PUBLICATIONS

Abstract only.*

Handbuch Der Galvanotechnik; Band 1, Teil 2, 1964, no month available.

* cited by examiner

*Primary Examiner*—Edna Wong
(74) *Attorney, Agent, or Firm*—Salter & Michaelson

(57) ABSTRACT

A system and method for providing a coating for protecting a surface from corrosion are provided. The method involves providing a system of layers on a light metal or light metal alloy substrate. The system of layers includes a nonconductive layer adjacent the substrate, followed by a conductive layer, an intermediate layer, and an decorative external layer.

19 Claims, 2 Drawing Sheets

METHOD FOR PRODUCING A CORROSION PROTECTIVE COATING AND A COATING SYSTEM FOR SUBSTRATES MADE OF LIGHT METAL

BACKGROUND

1. Technical Field

The present invention relates to a method of producing a protective coating for a substrate and, in particular, to a method of producing a protective coating for a substrate made of a light metal and alloys thereof to prevent corrosion of the substrate.

2. Related Art

Light metals, especially aluminum, are being used to an ever increasing extent for technological applications due to their very low specific gravity. However, a disadvantage of light metals is their propensity to corrode, which is a result of their electrochemically base metal nature. As a consequence, they are generally provided with protective layers to prevent or minimize corrosion.

One known method of this type involves depositing metal layers onto the light metal using a currentless electroplating process, or an electroless plating process. This method is of particular interest where heavy demands are imposed on the outer surface, such as in decorative surfaces. Examples of such applications include light metal wheel rims or wheel trims. Due to the heavy demands imposed on such decorative features, especially wheel trims, it is generally desirable to provide a chrome-plated exterior surface. Although known chrome-plated wheel rims of this type do initially meet these decoratively heavy demands, they are very susceptible to damage and thereby rapidly lose their attractiveness.

DE 196 21 881 A1 discloses chrome-plating car wheel rims by applying a primer layer of powder or wet lacquer, drying the layer, applying a layer of a wet synthetic lacquer, drying the synthetic layer, and finally chrome plating the surface. These varied manufacturing steps are extremely laborious and require the product to be repeatedly stored in other devices during the intermediate steps. In addition, it is necessary to allow time for the drying processes.

DE 195 39 645 A1 discloses a light metal rim for a car wheel coated by applying a glossy varnish to the rim, followed by an intermediate coating in the form of a powdered lacquer or bright nickel-plating formed thereover in order to level-out the exterior surface of the structure. A smooth base for a subsequently deposited, electro-platable, decorative bright metallization was thereby created.

For the purposes of galvanizing aluminum, it was proposed in Volume 1, Part 2, Chapter 15, page 1034 of the “Handbuch der Galvanotechnik,” published by Heinz W. Dettner and Johannes Elze (1964) that a highly adherent, intermediary metal layer should be applied initially and, as an alternative, it was mentioned that a porous oxide film could also be used. The metallic layers applied after the intermediary were each applied by an electroplating process, which is possible because both the intermediary metallic layer and the porous oxide film are conductive. It had already been established in the same treatise, that the substrate was easily corrodible thereby. Coatings produced in this manner are thus not protective against corrosion, but rather, just the opposite.

Therefore, in concrete and practical terms, the methods from the state of the art of producing decorative layers having good corrosion protective properties, on aluminum for example, appear to be somewhat as follows: a thin zinc layer incorporating a zincate mordant is formed on an aluminum substrate in electroless manner, followed by electroplating directly with copper and applying a duplex or tri-nickel layer using an electroplating process for the purposes of flattening and protecting against corrosion. A thin layer of bright chrome is then formed thereon using an electroplating process.

Such a system of layers provides the aluminum substrate with adequate protection against corrosion only insofar as the layer is not subjected to any form of mechanical damage which extends as far as the metal substrate.

If such a deeply extending form of damage to the layer or the system of layers occurs, then a voltaic cell ensues whereby the outer layer functions as a cathode and the substrate as an anode which will become oxidized.

Although chemically, chromium as such is a very base metal, it will attain a very positive potential due to the formation of a thin oxide layer on its outer surface (referred to as passivation layer). Oxygen will then be reduced on the outer surface which, in comparison to the aluminum exposed by the damage, has a very large surface area. The oxidization process hereby corresponds to a conversion of the metallic aluminum into $Al^{3+}$. The corrosion of the aluminum at this damaged spot is quite dramatic due to the very large cathode surface area of the chromium oxide. This is referred to as a catastrophic breakdown of the protective layer.

SUMMARY

One object of the present invention is to provide an alternative method of producing a corrosion protective coating for a substrate, preferably a light metal substrate, and a corresponding system of layers which is less sensitive to corrosion than known protective coatings.

One embodiment of the present method involves producing a protective coating for preventing corrosion on a substrate of light metal or light metal alloy in which an electrically non-conductive first layer is initially formed on the substrate whereby the non-conductive first layer is produced by anodic oxidization of the substrate, the non-conductive first layer produced by anodic oxidization is then sealed, whereafter a metallized layer is formed on the non-conductive first layer in electroless manner, and a third layer is then formed on the metallic second layer.

Another embodiment is directed to a system of layers formed according to the method. The system of layers includes a substrate of light metal or a light metal alloy, a non-conductive first layer thereon consisting of an oxide of the substrate material, a second layer including one or more metals formed on the first layer by means of a electroless process, and a third layer.

Preferably, a smoothing metallic intermediary layer may be applied between the second layer and the third layer for the purposes of smoothing and leveling. It is particularly preferred that the third layer be a decorative third layer.

BRIEF DESCRIPTION OF THE DRAWINGS

It should be understood that the drawings are provided for the purpose of illustration only and are not intended to define the limits of the invention. The foregoing and other objects and advantages of the embodiments described herein will become apparent with reference to the following detailed description when taken in conjunction with the accompanying drawings in which.

DETAILED DESCRIPTION OF THE PREFERRED EMBODIMENTS

The present invention is directed to a system of layers for protecting a substrate from corrosion and a method of forming the system of layers on the substrate.

Figure 1:
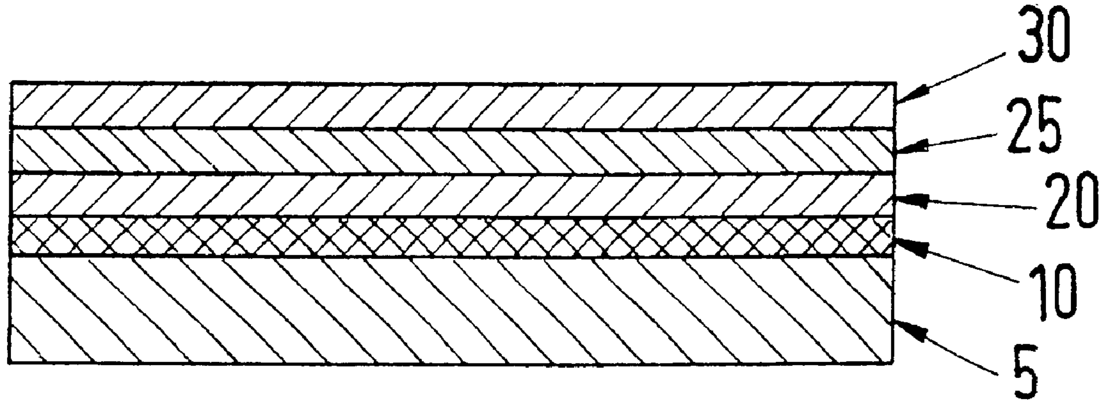
FIG. 1 is a cross-sectional schematic illustration of a system of layers formed on a substrate.
Figure 2:
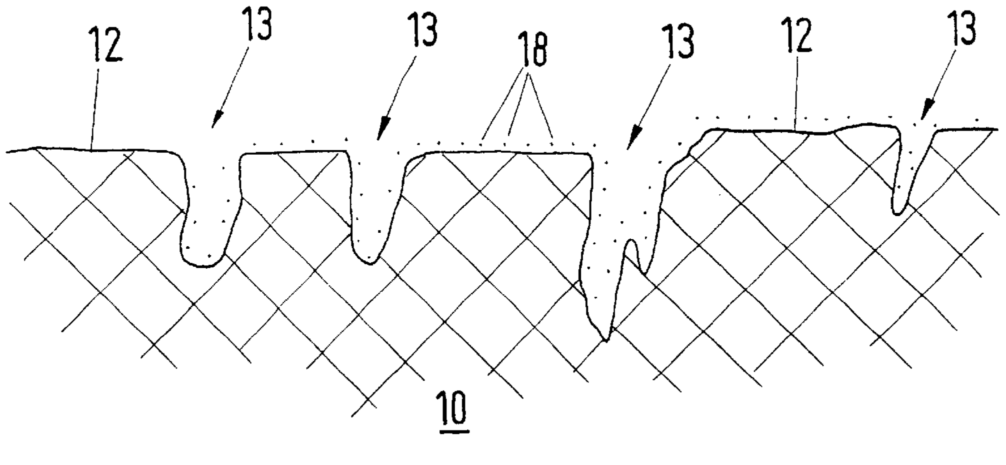
FIG. 2 is an enlarged cross-sectional schematic illustration of the surface of the non-conductive layer of the system of layers illustrated in FIG. 1.

The method of the invention facilitates the formation of a coating or system of layers illustrated cross-sectionally in FIGS. 1 and 2. As shown, a system of layers 1 (not shown) according to the present embodiment includes a substrate 5 having a surface 12, an electrically non-conductive layer 10 adjacent substrate surface 12, an electrically conductive layer 20 adjacent layer 10, and an external layer 30 adjacent electrically conductive layer 20. In some embodiments, an intermediate layer 25 may be disposed adjacent to and between layers 20 and 30, as described below. Preferably, layer 10 is disposed adjacently and in direct contact with substrate 5. Also preferably, each of the layers are disposed adjacently and in direct contact with each other.

Preferably, substrate 5 may be a light metal or an alloy of a light metal. In a particularly preferred embodiment, substrate 5 may be aluminum or an aluminum alloy. Substrate 5 may be, for example, the wheel rim for a motor vehicle.

Electrically non-conductive layer 10 may be integrally formed with or deposited onto surface 12 of substrate 5. The electrically non-conductive layer may be produced by many known processes including, but not limited to physical process such as Physical Vapor Deposition (PVD), plasma Chemical Vapor Deposition (CVD), an electrochemical process, and the like, or may be simple polymer layers such as lacquers. It is particularly preferred that the non-conductive layer be produced by anodic oxidization of the substrate. If, as is preferred, the substrate is aluminum or an aluminum alloy, then an anodizing process is utilized to form the non-conductive layer. The anodization process of the substrate is accomplished by connected up the substrate as an anode, after which the outer surface of the substrate will be oxidized by the application of a voltage. The oxide layer formed thereby is relatively chemically inert and forms an ideal electrical barrier, especially after it has been subjected to appropriate further treatments. In preferred embodiments, layer 10 is an integrally formed oxide layer formed by anodization of substrate 5. One preferred non-conductive material layer is an aluminum oxide layer formed on an aluminum substrate by anodization.

A plurality of pores 13 may be formed in or on the surface 12 of first layer 10 as the result of the anodization process, which is the preferred method of providing the non-conductive first layer 10.

Second layer 20 is preferably conductive, and preferably metallic. A metal layer, preferably of nickel, copper or any other metal which can be deposited in electroless manner, is formed on non-conductive layer 10, here preferably, the oxide layer, by means of a electroless process. Such electroless processes are generally known to provide relatively rough surfaces.

As in the state of the art, a decorative layer 30 may then be formed on layer 20, which is preferably chromium. Layer 30 may be preferably a decorative layer such as a bright chromium layer, which provides the externally decorative, low friction, and wear resistant properties, and combinations of such properties, to the finished article. A bright chromium layer may be deposited if the decorative properties of the finished product are to be particularly prominent as, for example, is the case for car wheel rims. If layer 30 should be required to be particularly wear resistant, then hard chromium may be considered. If low friction is desired, nickel-Teflon or lead could be used for externally decorative, low friction layers.

As stated above, in some embodiments, an intermediate layer 25 may be disposed adjacent and between layers 20 and 30. Preferably, layer 25 is conductive, and may be provided, for example, for flattening the relatively rough surface of layer 20. Preferably, intermediate layer 25 may be deposited by an electroplating process, which leads to slight. differences between the layer 20 and layer 25. Such differences exist even if layers 20 and 25 are formed from the same material, for example, nickel. The basis for such differences is due to the manner in which the layers are applied or deposited. For example, materials that are deposited chemically in a "electroless" manner generally contains, among other things, phosphorous or boron constituents, whereas materials deposited by electroplating do not includes phosphorous or boron constituents. The presence of such materials is of no consequence to the functionality of the system of layers. Copper may then be deposited on this metal layer by means of an electroplating process for the purposes of flattening the still rough outer surface, or for balancing out any mechanical tension, or else as a shiny surface, it also being conceivable to use nickel for similar purposes and, in particular, to provide additional protection against corrosion.

The border region between layers 10 and 20 is shown in enlarged view in FIG. 2. As stated previously, non-conductive first layer 10 includes an upper surface 12 on or on which a plurality of pores 13 may be typically formed. In the present embodiment, the size of the pores 13 may be reduced by a hot-water sealing process whereby the system of layers and, of course, the substrate on which they are formed, are immersed in boiling water.

It is preferred that upper surface 12 of substrate 5 may be activated simultaneously with its immersion into the boiling water by depositing conductive nucleating agents 18, preferably palladium nuclei. Because the size of pores 13 may be relatively large at this stage, nucleating agents 18 are able to penetrate into pores 13 and remain in pores 13 after the sealing process has ended and the pores 13 have become smaller.

After the assembly has been removed from the boiling water, the nucleating agents 18 which are preferably palladium nuclei remain on upper surface 12 and, more particularly, within the pores 13. The metallization process then takes place directly through the nucleating agents 18 by virtue of the materials of the second layer 20, such as copper and/or nickel in particular, which are now deposited in electroless manner. These materials thereby penetrate into pores 13, that is, they make particularly good contact with the material of the layer 10 precisely at these points. This leads to the firm adherence of layer 20 to layer 10, which is not illustrated in FIG. 2, due to the undercutting effect thereby achieved.

As stated previously, a prerequisite for the catastrophic breakdown of prior art systems of layers on a substrate typically occurs after damage to the system of layers, which causes electrical conductivity between the substrate acting as an anode, and the outer layer or layers acting as a cathode, following damage to the surface layers on a substrate.

Prior art systems of layers and methods of forming such systems of layers typically involved metallizing synthetic materials in electroless manner by roughening and appropriately activating the non-conductive outer surface of the synthetic material. Until recently, this technique was just barely possible for ceramic materials. Because oxide layers are considered ceramic, the activation of ceramic surfaces and firm adhesion of metallization onto ceramic surfaces has heretofore been problematic. In particular, for the purpose of attaining high adhesion in the case of metal layers formed by electroless processes on synthetic materials, it was usual until now to mechanically cramp the two outer surfaces together, in what is known in the art as a "push-button" effect. However, such an effect is possible only to a limited extent in the case of oxidized surfaces.

The present invention advantageously provides a process that may be used with non-conductive, or oxidized surfaces. The present method involves providing an electrically non-conductive layer between the substrate and the outer layers to prevent corrosion causing electrical conductivity between the substrate and the outer layers. In this manner, the present system of layers maintain their protective properties which lead to the particularly good functionality of the undamaged system of layers, whilst they may also be provided with such decorative effects as a bright chromium layer, wear resistance, low friction, and combinations thereof.

More specifically, the surface of the non-conductive or oxidized surface is sealed. Preferably, the non-conductive layer is formed from an anodic oxidization process, for example the anodized layer in the case of aluminum, which is sealed. During the sealing process, the size of the pores are reduced so as to exclude the possibility of local destruction of the non-conductive layer, something which could nevertheless occur with the possible consequence of conductive bridges being formed. The sealing of the pores may be accomplished by various methods, including the preferred method of "hot water sealing." The hot water sealing process involves immersing the oxidized substrate in boiling water. While immersed in the boiling water, the extant water-free $Al_2O_3$ is converted into a boehmite-type $Al_2O_3 \times H_2O$. The conversion of the oxide surface leads to the volume of the material around the pores expanding, thereby reducing the size of the pores.

The sealing process may be additionally used for the purpose of simultaneously activating the outer surface during the course of the sealing step. In this case, activation in the sense of metallizing the non-conductive surface may be effected by depositing conductive nucleating agents on the non-conductive surface. Preferably, the conductive nucleating agents are noble metal crystallization nuclei, especially a conductive palladium nuclei. The conductive nucleating agents may be deposited on the outer surface of the non-conductive layer during the sealing process such that the nucleating agents penetrate into the pores of the non-conductive layer as the size of the pores are being reduced. This makes it possible for the nucleating agents not only to effect a metallization process in the next step of the method by the formation of another layer on the non-conductive first layer, but also that this metallization process takes place in the pores which have now been reduced in size. The conductive metallic second layer thus projects into the pores, thereby producing the effect of undercutting the pores and ensuring close engagement and adherence between the non-conductive first layer and the conductive second layer.

After the second layer has been applied, it is then easily possible to apply further layers by an electroplating process for example and finally, to apply a decorative layer especially a chromium layer.

While there is shown and described herein certain specific structure embodying the invention, it will be apparent to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A method of producing a protective coating for a metallic substrate having a surface, comprising:

forming an electrically non-conductive oxide layer on the surface of the substrate;

depositing conductive nucleating agents onto the electrically non-conductive oxide layer;

sealing the electrically non-conductive oxide layer to form a sealed surface;

forming a metallized layer being electrically conductive over the sealed surface by an electroless process; and forming a third layer over the metallized layer.

2. The method of claim 1, wherein the electrically non-conductive oxide layer is formed by an anodization process.

3. The method of claim 2, wherein the step of depositing conductive nucleating agents onto the electrically non-conductive oxide layer is performed before the step of sealing the surface of the electrically non-conductive oxide layer.

4. The method of claim 2, wherein the step of depositing conductive nucleating agents onto the electrically non-conductive oxide layer is performed simultaneously with the step of sealing the surface.

5. The method of claim 1, wherein the upper surface of the electrically non-conductive oxide layer includes a plurality of pores, and further comprising the step of depositing the conductive nucleating agents into the plurality of pores thereby performing an activating process simultaneously with the step of sealing the surface of the electrically non-conductive oxide layer.

6. The method of claim 5, wherein the conductive nucleating agents are noble metal crystallization nuclei.

7. The method of claim 6, wherein the noble metal crystallization nuclei include palladium nuclei.

8. The method of claim 7, further comprising forming an intermediate layer disposed between the metallized layer and the third layer.

9. The method of claim 8, wherein the intermediate layer is a smoothing metallic layer.

10. The method of claim 1, wherein the third layer is chromium.

11. The method of claim 1, wherein the third layer comprises a material having low friction coefficient.

12. The method of claim 1, wherein the third layer comprises a material having wear resistant properties.

13. The method of claim 1, wherein the substrate is selected from the group consisting of aluminum, magnesium, and alloys thereof.

14. The method of claim 1, wherein the substrate is aluminum.

15. The method of claim 1, wherein the substrate is a wheel rim.

16. A protective coating for a metallic substrate having a surface, comprising:

an electrically non-conductive oxide layer on the surface of the substrate, the electrically non-conductive oxide layer being sealed;

an electrically conductive metallized layer directly contacting the surface of the sealed electrically non-conductive oxide layer; and a third layer over the electrically conductive metallized layer;

wherein the electrically non-conductive oxide layer comprises conductive nucleating agents.

17. The protective coating of claim 16, further comprising an intermediate layer disposed between the electrically conductive metallized layer and the third layer.

18. The protective coating of claim 16, wherein the third layer is chromium.

19. A method of using a protective coating as a corrosion preventing coating, comprising:

providing an electrically non-conductive oxide layer overlaying and in direct contact with a surface of a substrate, the electrically non-conductive oxide layer having a sealed surface and comprising conductive nucleating agents;

an electrically conductive metallized layer overlaying and in direct contact with the sealed surface of the electrically non-conductive oxide layer, the electrically conductive metallized layer being formed by an electroless process;

a third layer overlaying the electrically conductive metallized layer wherein the layer from the protective coating; and using the protective coating as a corrosion preventing coating.

* * * * *